(12) United States Patent
Borovikov et al.

(10) Patent No.: US 11,648,477 B2
(45) Date of Patent: May 16, 2023

(54) SYSTEMS AND METHODS FOR GENERATING A MODEL OF A CHARACTER FROM ONE OR MORE IMAGES

(71) Applicant: Electronic Arts Inc., Redwood City, CA (US)

(72) Inventors: Igor Borovikov, Foster City, CA (US); Pawel Piotr Wrotek, San Mateo, CA (US); Mohsen Sardari, Redwood City, CA (US); Harold Chaput, Belmont, CA (US); Navid Aghdaie, San Jose, CA (US); Kazi Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/744,368

(22) Filed: May 13, 2022

(65) Prior Publication Data

US 2022/0270324 A1 Aug. 25, 2022

Related U.S. Application Data

(63) Continuation of application No. 16/854,101, filed on Apr. 21, 2020, now Pat. No. 11,367,254.

(51) Int. Cl.
*A63F 13/00* (2014.01)
*A63F 13/63* (2014.01)
(Continued)

(52) U.S. Cl.
CPC ............. *A63F 13/63* (2014.09); *A63F 13/58* (2014.09); *G06F 18/214* (2023.01); *G06N 3/08* (2013.01);
(Continued)

(58) Field of Classification Search
None
See application file for complete search history.

(56) References Cited

U.S. PATENT DOCUMENTS 9,190,055 B1 * 11/2015 Kiss ..................... G10L 15/063
9,501,724 B1 * 11/2016 Yang .................... G06V 30/245
(Continued)

OTHER PUBLICATIONS

U.S. Appl. No. 16/854,101, filed Apr. 21, 2020.

*Primary Examiner* — Martin Mushambo
(74) *Attorney, Agent, or Firm* — Leydig, Voit & Mayer, Ltd.

(57) ABSTRACT

A method, computer-readable storage medium, and device for generating a character model. The method comprises: receiving an input image of a reference subject; processing the input image to generate a normalized image; identifying a set of features present in the normalized image, wherein each feature in the set of features corresponds to a portion of a head or body of the reference subject; for each feature in the set of features, processing at least a portion of the normalized image including the feature by a neural network model corresponding to the feature to generate a parameter vector corresponding to the feature; and combining the parameter vectors output by respective neural network models corresponding to respective features in the set of features to generate a parameterized character model corresponding to reference subject in the input image.

18 Claims, 12 Drawing Sheets

(51) Int. Cl.
  *G06T 17/10* (2006.01)
  *A63F 13/58* (2014.01)
  *G06N 3/08* (2023.01)
  *G06V 40/10* (2022.01)
  *G06F 18/214* (2023.01)
  *G06V 10/764* (2022.01)
  *G06V 10/774* (2022.01)
  *G06V 10/82* (2022.01)
  *G06V 10/32* (2022.01)
  *G06V 10/34* (2022.01)

(52) U.S. Cl.
  CPC .............. *G06T 17/10* (2013.01); *G06V 10/32* (2022.01); *G06V 10/34* (2022.01); *G06V 10/764* (2022.01); *G06V 10/774* (2022.01); *G06V 10/82* (2022.01); *G06V 40/10* (2022.01); *G06T 2210/22* (2013.01); *G06T 2210/36* (2013.01)

(56) References Cited

U.S. PATENT DOCUMENTS

| | | | |
|---|---|---|---|
| 9,892,540 B2 | 2/2018 | Nair et al. | |
| 10,470,510 B1* | 11/2019 | Koh | G06V 40/103 |
| 2012/0321125 A1* | 12/2012 | Choi | G06V 10/431 |
| | | | 382/100 |
| 2014/0301608 A1* | 10/2014 | Karthikeyan | G06V 30/262 |
| | | | 382/113 |
| 2017/0262959 A1* | 9/2017 | Lee | G06T 7/32 |
| 2017/0262991 A1* | 9/2017 | Davidson | G06T 11/001 |
| 2018/0276454 A1* | 9/2018 | Han | G06V 40/171 |
| 2018/0325478 A1* | 11/2018 | Li | A61B 6/463 |
| 2019/0325605 A1* | 10/2019 | Ye | G06K 9/6277 |
| 2020/0065384 A1* | 2/2020 | Costello | G06N 3/0445 |
| 2020/0293888 A1* | 9/2020 | Meyerson | G06N 3/0454 |
| 2020/0320817 A1* | 10/2020 | Liu | G07D 7/202 |
| 2020/0357102 A1* | 11/2020 | Pekkucuksen | H04N 5/2355 |
| 2021/0104086 A1* | 4/2021 | Wang | G06T 19/20 |

\* cited by examiner

SYSTEMS AND METHODS FOR GENERATING A MODEL OF A CHARACTER FROM ONE OR MORE IMAGES

CROSS-REFERENCE TO RELATED APPLICATIONS

This application is a continuation of U.S. patent application Ser. No. 16/854,101, filed on Apr. 21, 2020, which is hereby incorporated by reference in its entirety.

FIELD

This disclosure generally relates to computer graphics and, more particularly, to systems and methods for generating a model of a character from one or more images.

BACKGROUND

In computer-generated graphics applications, such as video games or animated films, characters in the graphics application typically comprise 3D (three-dimensional) character models. In the context of video games, an in-game character model may include hundreds of parameters. The parameters can give the in-game character a distinct appearance.

Some graphics applications may provide the ability for a user to generate a customized character. For example, a user may wish to create a character representing the user or a famous person, such as a celebrity. The graphics application may include customizable parameters for a user to generate the custom character.

However, manually creating an suitable representation of custom character that accurately depicts a desired reference is difficult and time consuming. Some level of artistic competence is usually needed to obtain a good result. Even with intuitive direct on-screen manipulation of the parameters of a 3D model representing the character, fine tuning the appearance of the character to match a reference is difficult. The difficulty lies in navigating and manipulating a high-dimensional space of continuous and parameters by a human user.

As such, there remains a need in the art for a system and method for more easily generating a model of a character.

SUMMARY

Embodiments of the disclosure provide a method, computer-readable storage medium, and device for generating a character model. The method comprises: receiving an input image of a reference subject; processing the input image to generate a normalized image; identifying a set of features present in the normalized image, wherein each feature in the set of features corresponds to a portion of a head or body of the reference subject; for each feature in the set of features, processing at least a portion of the normalized image including the feature by a neural network model corresponding to the feature to generate a parameter vector corresponding to the feature; and combining the parameter vectors output by respective neural network models corresponding to respective features in the set of features to generate a parameterized character model corresponding to reference subject in the input image.

DETAILED DESCRIPTION

Figure 1:
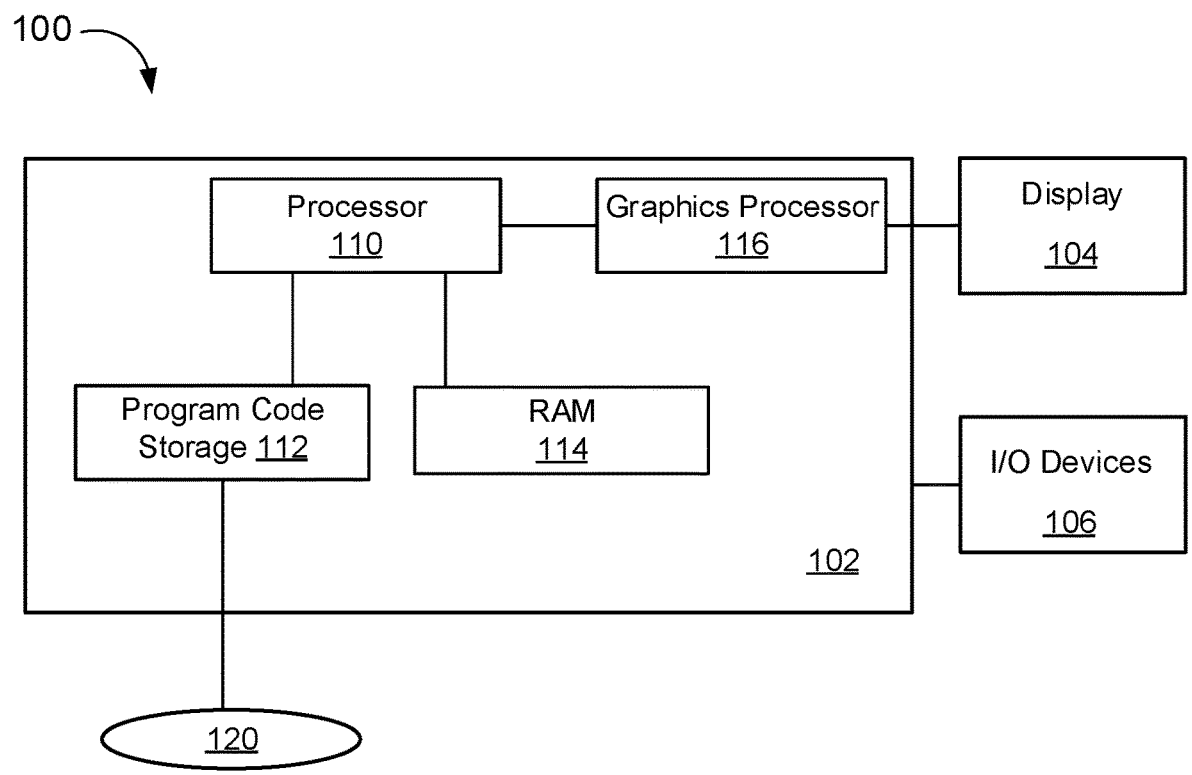
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide systems and methods for generating a model of a character from one or more images. The disclosed systems and methods provide an automated computer vision and machine learning system for extracting relevant parameters from one or more reference images provided by a user to construct a corresponding model of a character matching the appearance of the one or more reference images.

As described in greater detail below, one embodiment provides one or more trained neural network models to generate a character model for a character that matches the provided reference image(s). The one or more neural network models are configured to map the reference images, or portions thereof, to a parameter space accepted by a graphics application (e.g., video game) for rendering the character.

One embodiment provides a computer vision system that generates the character model by direct optimization. Such a system may have a direct connection to a game engine used for rendering characters. The system iteratively updates parameters of the character model, compares a corresponding rendered image to a reference, and estimates the direction in which parameters need to change to improve the likeliness.

Taking the context of video games as an example, the display of a video game is generally a video sequence presented to a display capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frame-per-second video, if one frame represents the scene at t=0, then the next frame would represent the scene at t=1/60 second. In some cases, a frame might represent the scene from t=0 to t=1/60, but in the simple case, the frame is a snapshot in time.

A "scene" comprises those simulated objects that are positioned in a world coordinate space within a view pyramid, view rectangular prism or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects with some of the objects being animated, in that the objects appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

In some embodiments, a character may be modeled as a skeleton comprising a plurality of body parts with joint constraints. Joint constraints might include attachment points (some of which might be pivot-able), range of motion, degrees of freedom, masses, and possibly strength limits and distribution of masses. For example, a football player might be modeled with a torso, upper arms, forearms, head, waist, legs, fingers, etc., with the upper arm constrained to remain joined to the forearm at the elbow with less than 180 degrees of joint movement at the elbow. In some embodiments, a skeleton can thus be represented in game data structures as a collection of body part data structures and a collection of joint constraints. A skeleton data structure might include data to hierarchically link body parts, such as pointers to parent and child body parts. A skeleton in an animated motion might further include as part of its state the positions/orientations of skeleton parts, velocity/angular moment and a set of force/torque vectors on some or all body parts for each frame of the animated motion.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
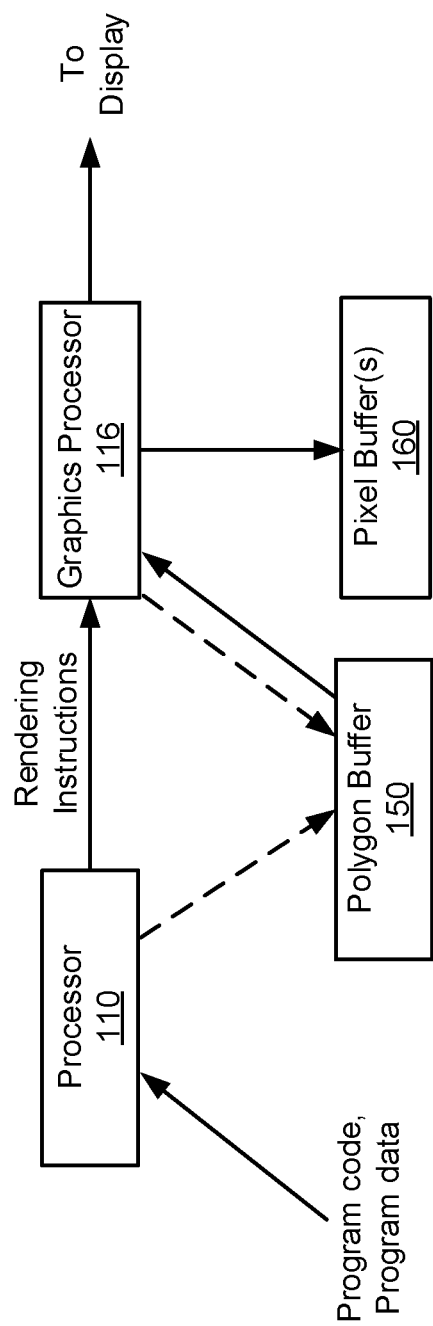
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
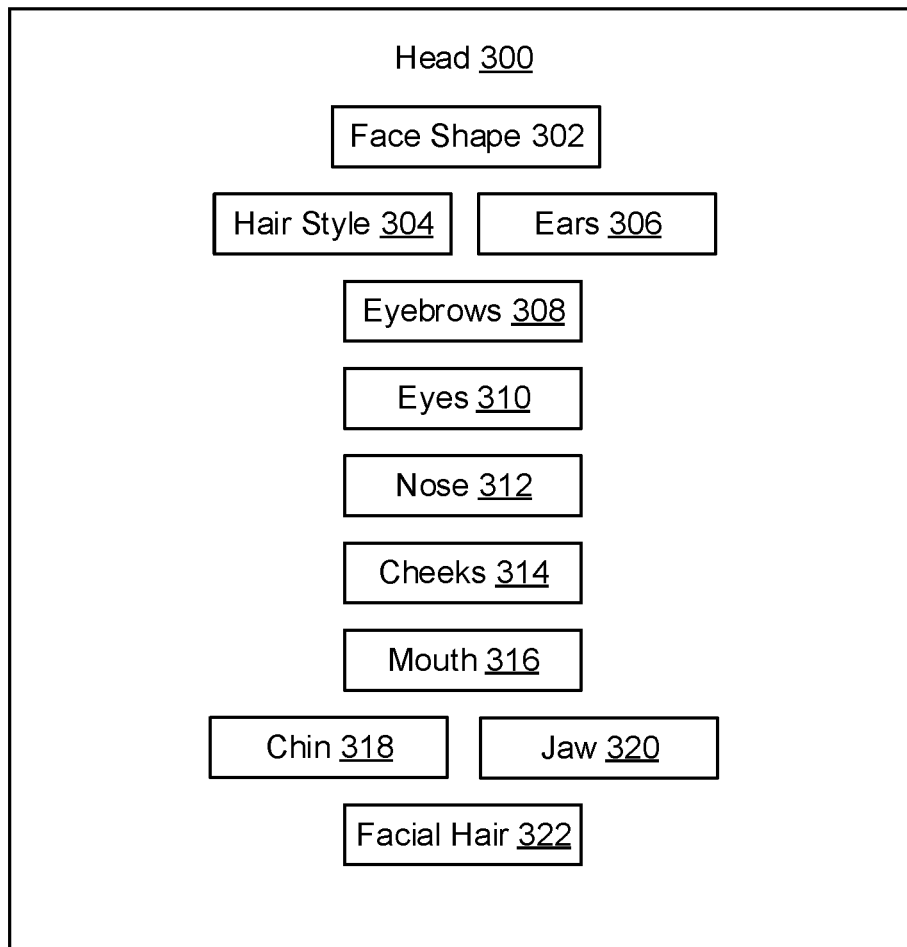
FIG. 3 is a block diagram illustrating features of a model of a head of a character, according to one embodiment.

FIG. 3 is a block diagram illustrating features of a model of a head 300 of a character, according to one embodiment. As shown, the head 300 could include a variety of features. Non-limiting examples shown in FIG. 3 include features of face shape 302, hair style 304, ears 306, eyebrows 308, eyes 310, nose 312, cheeks 314, mouth 316, chin 318, jaw 320, and facial hair 322. The features shown in FIG. 3 are merely examples, and some models of a head 300 may include more or fewer features than in the example of FIG. 3. A character model can also include other features representing, for example, other characteristics of the body of the character.

Each of the features 302-322 of the model of the head 300 can include parameters that are modifiable to customize the appearance of a character rendered from the corresponding character model. In some embodiments, the head 300 is symmetrical on the left and right sides. In other embodiments, left- and right-side features are separately configurable (e.g., left eye may have a different color than the right eye, or some asymmetry may exist in the mouth or cheeks, for example). In such embodiments, the left side feature may be a separately parameterized data structure (e.g., parameter vector) from the right side feature.

Figure 4:
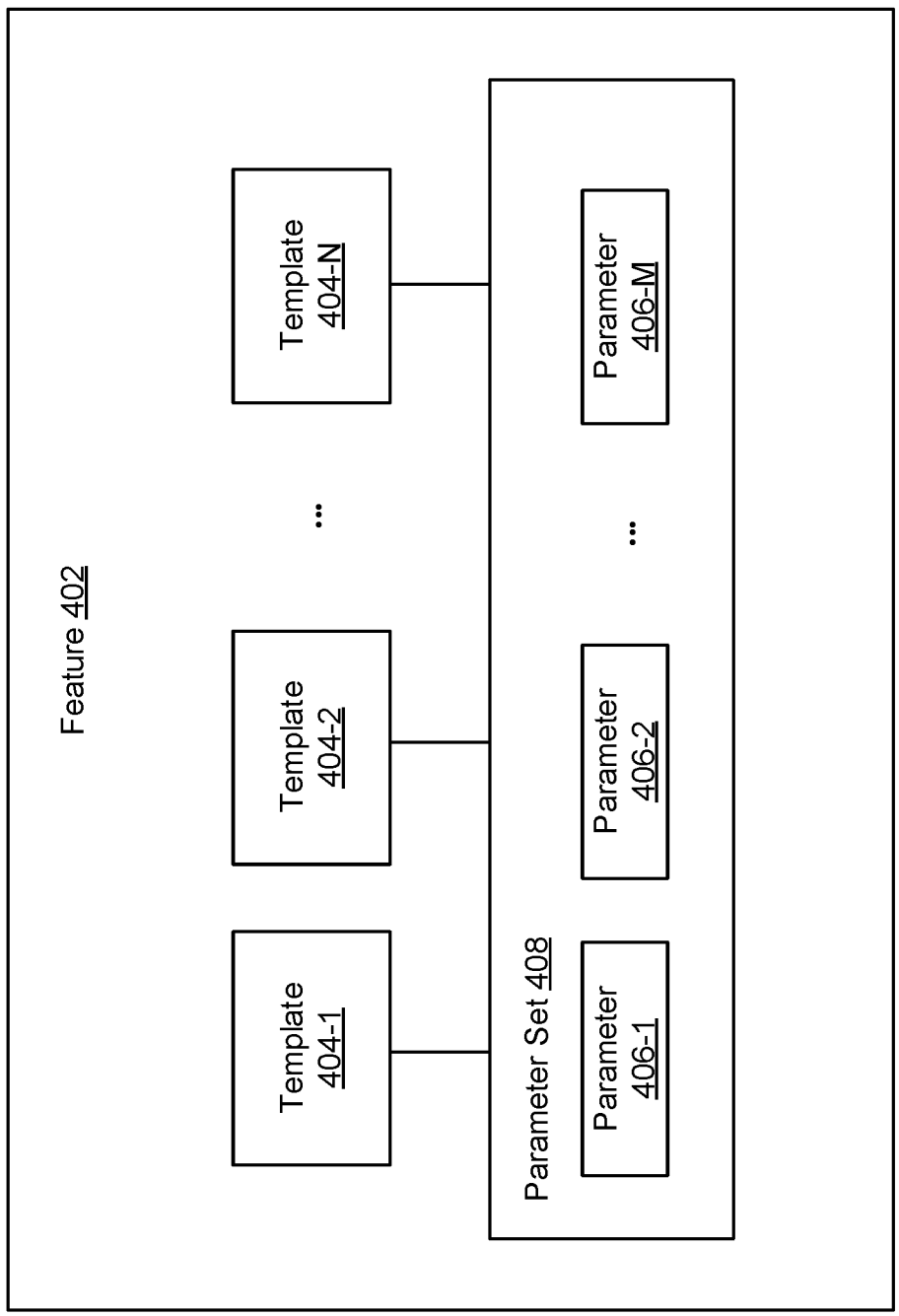
FIG. 4 is an example of a block diagram of feature templates, according to one embodiment.

In some embodiments, for each feature 302-322, there may be a series of presets or templates for the user to select from as a starting point for customizing the appearance of the character. FIG. 4 is an example of a block diagram of feature templates, according to one embodiment. Shown in FIG. 4 is an example of data structures corresponding to one feature 402. The feature 402 can be any of the features 302 to 322, such as a mouth 316 as shown in FIG. 3, for example.

The feature 402 may be parameterized by a parameter set 408 comprising M number of parameters 406-1 to 406-M. The parameters 406-1 to 406-M can be stored as a vector of M length, where each field of the vector corresponds to a parameter value for a respective parameter 406-1 to 406-M. The vector for the feature 402 is referred to herein as a "parameter vector." In some embodiments, each feature can have a different number of parameters or the same number of parameters as other features.

As also shown in FIG. 4, a series of N templates 404-1 to 404-N may be available for the feature 402. In one embodiment, each template 404-1 to 404-N is associated with pre-configured parameter values for each of the parameters 406-1 to 406-M for the feature 402.

When customizing a character manually to match a reference, in some embodiments, a user may select one of the templates 404-1 to 404-N (e.g., by direct selection by the user or by random selection by a game engine) as a starting point that closely resembles the reference, and then manually adjust individual parameter values to fine tune the appearance of the character.

In one embodiment, the selection of a particular template 404-1 to 404-N can be considered as a selection of a "discrete" parameter (i.e., from a series of N discrete choices), and modifying the parameter values of the parameters 406-1 to 406-M may be considered as modifying "continuous" parameters (e.g., within the limit bounds of the respective parameters).

Figure 5:
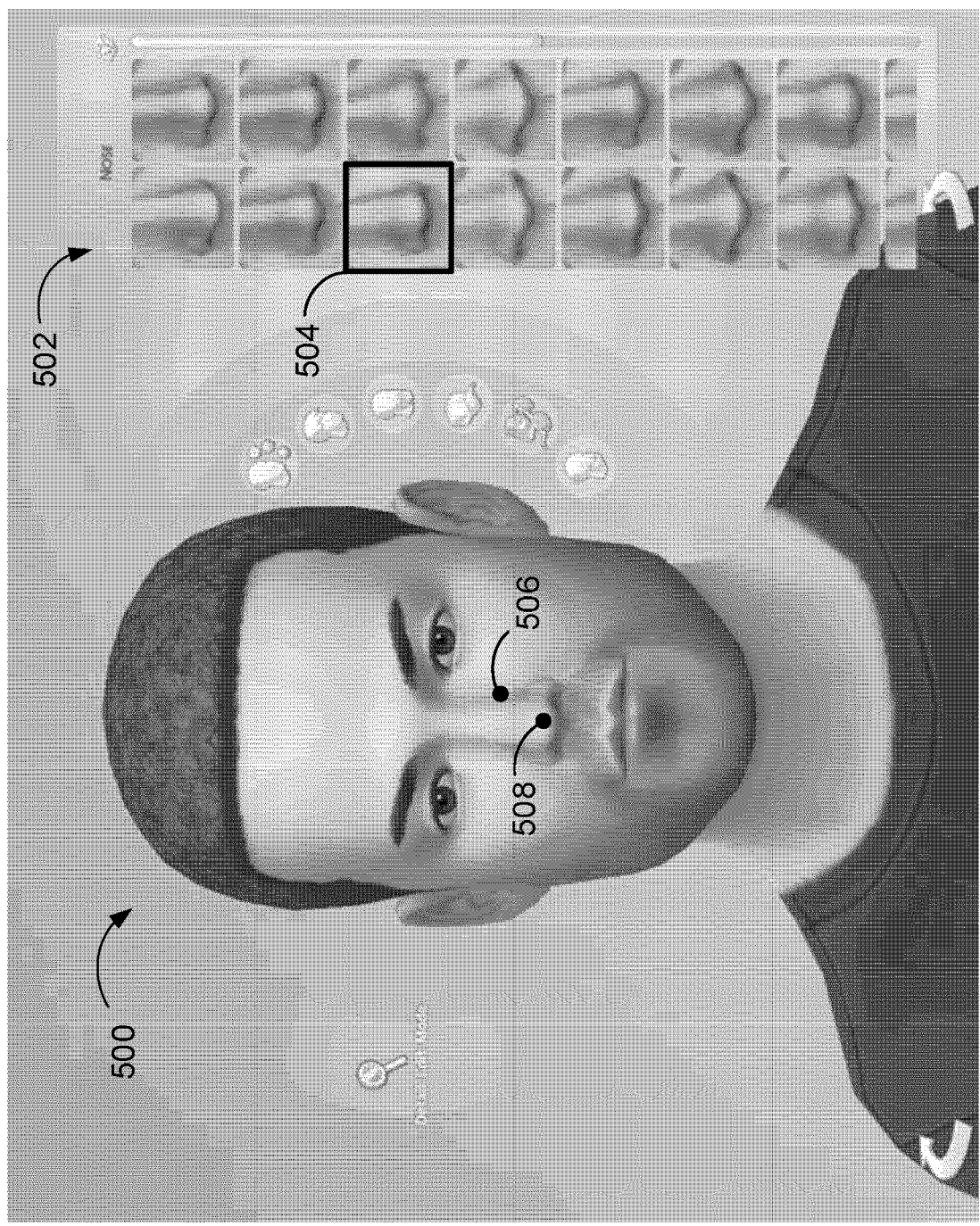
FIG. 5 is an example of a graphical user interface for selecting a template for a feature and modifying parameters corresponding to template, according to one embodiment.

FIG. 5 is an example of a graphical user interface for selecting a template for a feature and modifying parameters corresponding to template, according to one embodiment. As shown in FIG. 5, a representation of a character 500 is displayed in a graphical user interface. Also displayed are a series of templates 502 for the nose of the character 500. In the example shown, template 504 is selected. In the example graphical user interface in FIG. 5, a user can modify the parameter values for parameters of the various features (such as the "nose" feature) by on-screen manipulation. For example, a user can click-and-drag on different portions of the feature (i.e., this case the nose) to fine-tune the shape of the feature. For example, the user can click-and-drag on the side 506 of the nose or the tip 508 of the nose to manually adjust the shape of the nose. Such manual adjustment of the nose thereby modifies the parameter values of the underlying parameters of the selected feature. This manual process of selecting a template and modifying its preset parameter values can be repeated for each feature (e.g., eyes, nose, mouth, etc.). However, the manual process of selecting a template and modifying it to match a target representation can be time consuming and difficult.

As described, one embodiment provides one or more trained neural network models to generate a character model that matches one or more reference images. The one or more neural network models are configured to maps the one or more reference images to a parameter space accepted by the graphics application (e.g., video game).

Figure 6:
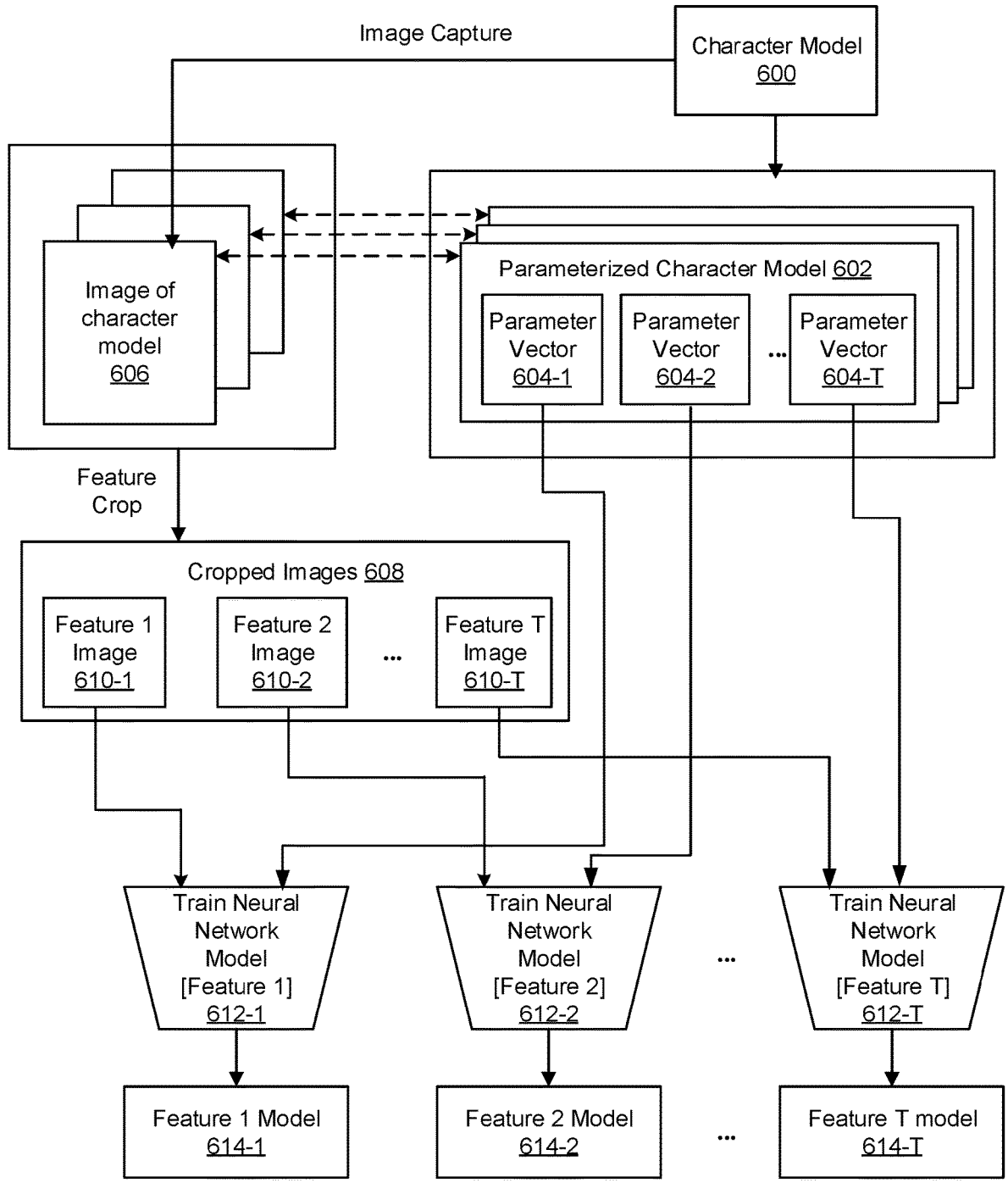
FIG. 6 is a block diagram illustrating training a machine learning system to generate a character model from one or more reference images, according to one embodiment.

FIG. 6 is a block diagram illustrating training a machine learning system to generate a character model from one or more reference images, according to one embodiment.

In one embodiment, the machine learning system trains a separate neural network model 614-1 to 614-T for each of T features of the character. The features may be individual features of the character's head and/or body. The examples described throughout this disclosure relate to features of a character's head, as the head is often the most critical portion of the character when matching a character model to a reference. However, such examples related to the head are non-limiting, as other features related to the body of the character are also within the scope of the disclosure. In some embodiments, features of the character's body, such as height, weight, muscle tone, etc. are also features used to parameterize the character model. When trained, the machine learning system provides a single-shot computational path to generate the parameters for a 3D character model.

In one embodiment, the training data used to train the neural network models are images captured of other characters existing in a game. For example, a game engine may have access to pre-existing assets (i.e., characters) of the game. The characters in the game may be stylized a certain way for the particular game, e.g., to have a certain cartoonish look with certain characteristics.

A three-dimensional character model 600 can be provided, e.g., as an existing game asset. A game engine is configured to capture one or more images 606 of the character model 600. Multiple images can be rendered for one character model 600 with different camera angles, animation phases, and/or lighting to provide more robust training data to the machine learning system. An example image of a head of a character model is shown as image 700 in FIG. 7A.

The character model 600 can be represented as a parameterized character model 602, where each feature (for example, "Feature 1" to "Feature T" in FIG. 6) of the parameterized character model 600 may be represented by a parameter vector 604-1 to 604-T, respectively. Each parameter vector 604-1 to 604-T includes parameter values for the respective feature (e.g., Feature 1 to Feature T).

In one embodiment, each image 606 that is captured by the game engine is associated with separate parameterized character model 602 of parameter vectors 604-1 to 604-T. This may be, for example, due to changes in the facial expressions of the character while performing different actions that are captured in the different images 606 of the character.

As also shown in FIG. 6, each image 606 of the character can be proposed and cropped into cropped images 608 representing individual features 610-1 to 610-T. An example image of character model with feature crops overlaid on the image is shown as image 750 in FIG. 7B. As shown, image 750 has been rotated relative to image 700 in FIG. 7A to straighten the face relative to a neutral position. Image 750 also includes a feature crop 702 of the right eye, a feature crop 704 of the left eye, a feature crop 706 of the nose, and a feature crop 708 of the mouth. Each feature crop 702, 704, 706, 708 includes the feature in question and some surrounding area for context. Various known techniques can be used to identify portions of an input image that include the respective features. As also shown, there may be overlap between the different feature crops 702, 704, 706, 708.

Referring back to FIG. 6, for a given image 606 and corresponding parameterized character model 602, a cropped image 610-1 of Feature 1 and a parameter vector 604-1 of Feature 1 are input into a neural network model corresponding to Feature 1 to train the neural network model 612-1 corresponding to Feature 1. Similarly, for a given image 606 and corresponding parameterized character model 602, a cropped image 610-2 of Feature 2 and a parameter vector 604-2 of Feature 2 are input into a neural network model corresponding to Feature 2 to train the neural network model 612-2 corresponding to Feature 2. This process is repeated for a given image 606 and corresponding parameterized character model 602, where a cropped image 610-T of Feature T and a parameter vector 604-T of Feature T are input into a neural network model corresponding to Feature T to train the neural network model 612-T corresponding to Feature T.

Each of the various images 606 and corresponding parameterized character models 602 can be processed in the same manner. Moreover, additional character models (not shown in FIG. 6) may be provided, where one or more images are captured of the additional character models. Cropped feature images of the additional character models and corresponding parameter vectors are input into the respective neural network models to train the models.

The output of each of the neural network models 612-1 to 612-T is a trained feature model 614-1 to 614-T, respectively. Each trained feature model 614-1 to 614-T is configured to receive an input image (e.g., corresponding to the feature in question) and output a parameter vector representing the feature in the input image.

In various embodiments, any machine learning system can be used to train the feature models 614-1 to 614-T, such as convolutional neural networks (CNNs). In one embodiment, each of the feature models 614-1 to 614-T comprises an autoencoder.

The machine learning system can be part of the game itself, or can run on a separate platform (e.g., mobile device, web browser, etc.) to generate parameter vectors later consumed by the game engine. In the case of full integration with a video game, once the machine learning system is trained, an input image can be consumed by the video game in the corresponding mode and display the results to the user without exiting the game or using any other application. The player gets immediate access to the results in the visual form and can fine-tune the model.

In various embodiments, the game can be executed on user hardware (e.g., console, computer, mobile device, tablet, web browser, etc.) or on a server. The server may be operated by a game provider, such as when the user does not own a copy of the game. In such a case, the user hardware may receive the input image from the user and process the input image to generate the character model. The user hardware may then transmit the character model (including the parameter values for the various features) to the server to render an image of the character from the character model. The user hardware then receives a number of rendered images or videos showing the reconstructed character either in email, or as a weblink, or using other delivery method, such as over the Internet.

Figure 8:
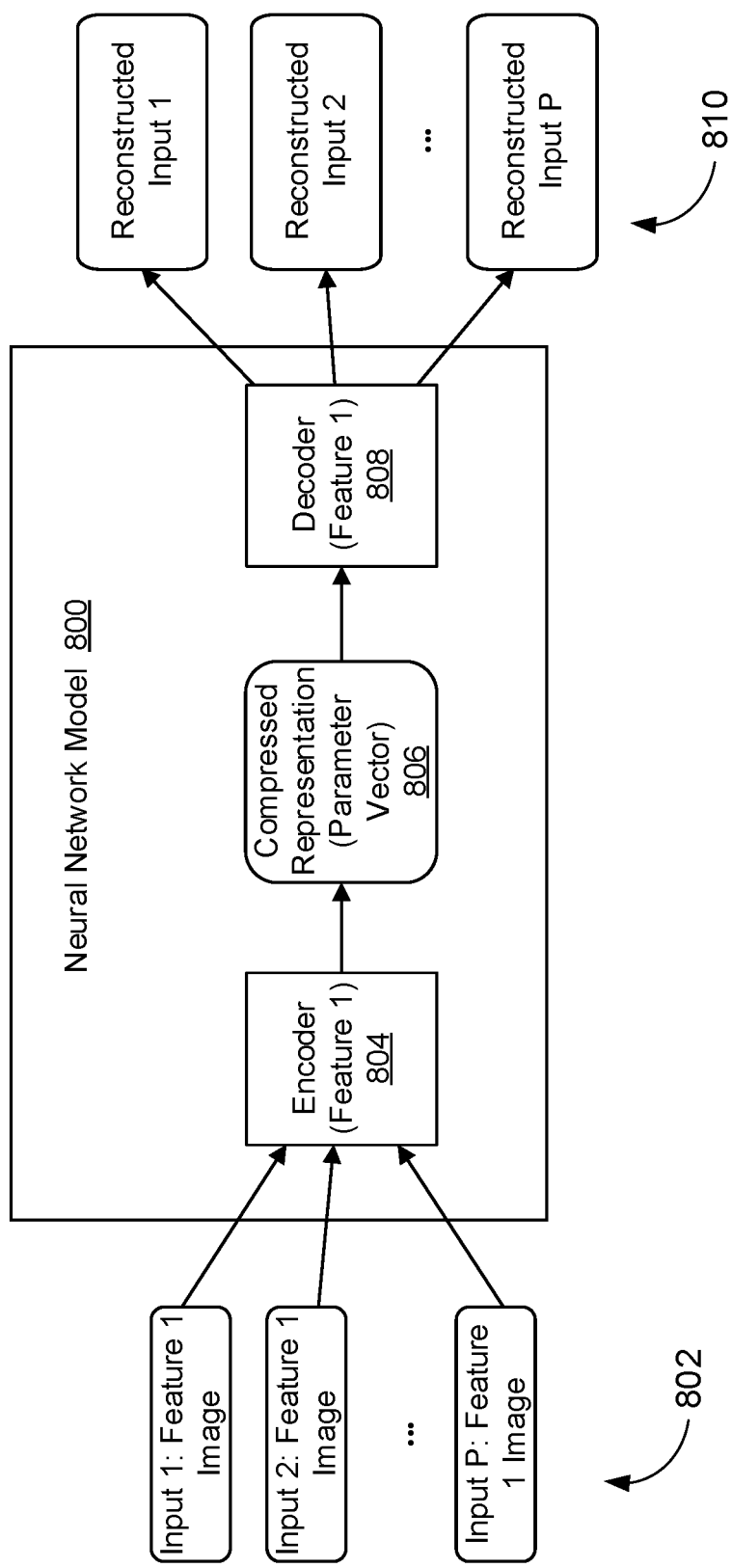
FIG. 8 is block diagram illustrating training a neural network model to generate one or more parameter vectors from an input image, according to one embodiment.

FIG. 8 is block diagram illustrating training a neural network model 800 to generate one or more parameter vectors from an input image, according to one embodiment. In one embodiment, a separate encoder and decoder is trained for each feature of a character model. Training an individual encoder and decoder for a given feature is shown in FIG. 8. The training process could then be repeated for each feature to train an encoder and a decoder for the given feature.

As shown in FIG. 8, a series of "P" input images 802 (i.e., labeled "Input 1" to "Input P") is input into the neural network model 800. In one embodiment, the neural network model 800 comprises an autoencoder. Autoencoders are a type of learning model that can learn to generate a compressed space representation of input data using an encoder and then decode the compressed representing using a decoder to reconstruct the input data. The autoencoder can be implemented as a convolutional neural network (CNN).

A CNN is a type of machine learning implementation. A CNN consists of a number of layers of "neurons" or "feature maps," also called convolution layers, followed by a number of layers called fully connected layers. The output of a feature map is called a feature. In the convolution layers, the CNN extracts the essential aspects of an input (e.g., an input image 802) in a progressively hierarchical fashion (i.e., from simple to complex) by combinatorically combining features from the previous layer in the next layer through a weighted non-linear function. In the fully connected layers, the CNN then associates the most complex features of the input computed by the last convolution layer with any desired output type, e.g., parameter vector 604-1 to 604-T in FIG. 6, by outputting a non-linear weighted function of the features. The various weights are adjusted during training, by comparing the actual output of the network with the desired output and using a measure of their difference ("loss function") to calculate the amount of change in weights using a backpropagation algorithm.

In the example shown in FIG. 8 for training an encoder and corresponding decoder for a given feature (i.e., "Feature 1" in FIG. 8), each input image 802 may be a cropped feature image that includes the feature in question. In other embodiments, the image may be an image of the whole character or some portion thereof (e.g., the head), and the neural network model 800 is configured to detect where in the image the feature in question is located.

For a given input image 802, the encoder 804 is trained to map the input image 802 into a compressed representation 806 of the input image (also referred to as a "latent space representation"). In one embodiment, the compressed representation 806 comprises a parameter vector for the given feature. The data in the compressed representation 806 is then input into a decoder 808 that is trained to recover the corresponding input image from the compressed representation 806, shown as reconstructed input images 810.

In the embodiments shown in FIG. 6 and FIG. 8, neural network models are trained for the purpose of parameterizing character features from images. Other implementations within the scope of the disclosure can use any machine learning model besides neural networks. Other embodiments may employ regression forests or support vector machines, for example.

Figure 9:
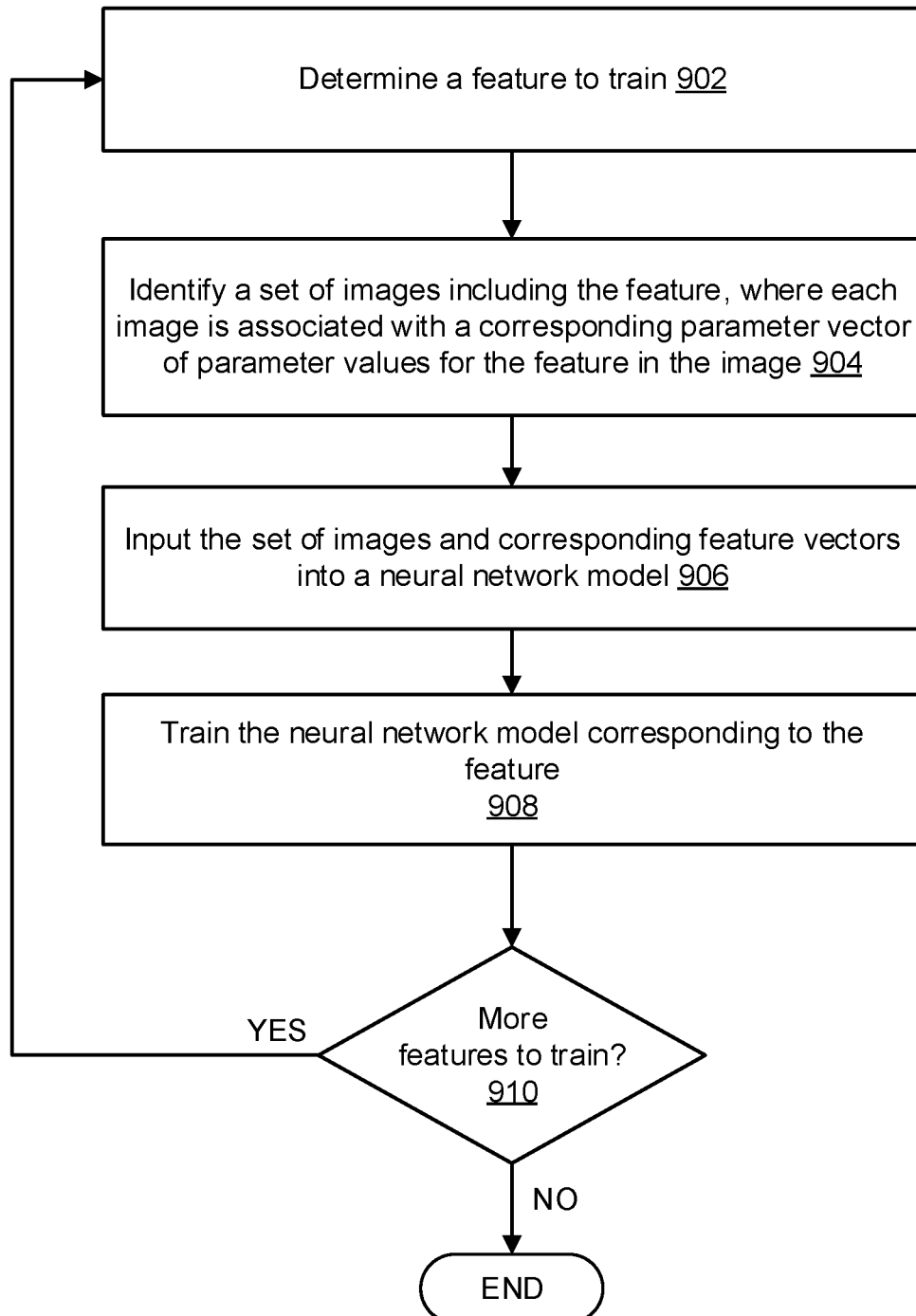
FIG. 9 is a flow diagram of method steps for training a neural network model to generate one or more parameter vectors from an input image, according to one embodiment.

FIG. 9 is a flow diagram of method steps for training a neural network model to generate one or more parameter vectors from an input image, according to one embodiment. In various implementations, the method can be performed by the processor 110, the graphics processor 116, or a combination of the processor 110 and the graphics processor 116.

As shown, the method begins at step 902, where a processor determines a feature to train. As described, a character model can be subdivided into a series of features, such as eyes, nose, mouth, etc. In one embodiment, a neural network model is trained for each feature.

At step 904, the processor identifies a set of images including the feature, where each image is associated with a corresponding parameter vector of parameter values for the feature in the image. In one embodiment, the image may be an image of the entire character or a portion of the character. In one example, the image of the portion of the character could be an image of just the head of the character. In another example, the image of the portion of the character could be a cropped image that include the feature in question plus some additional surrounding areas for context. As described in FIG. 6, the images of the character can be obtained from existing character assets. As such, the character models for the existing character assets are known. When an image is captured, the corresponding character model (including parameter vectors for each feature of the character) is determined and stored.

At step 906, the processor inputs the set of images and corresponding parameter vectors into a neural network model. As previously described, the neural network model may comprise an autoencoder implemented as a CNN. In other embodiments, any machine learning model besides neural networks can be used, such as regression forests or support vector machines, for example.

At step 908, the processor trains the neural network model corresponding to the feature. For example, an encoder is configured encode an input image into a compressed space representation (i.e., the parameter vector). The decoder is configured generate an output image (i.e., a reconstruction of the input image) from the compressed space representation of the input image.

At step 910, the processor determines whether there are more features to process. If yes, then the method returns to step 902, described above, to train a neural network model for other features. In no more features are left to be trained, the method ends.

Figure 10:
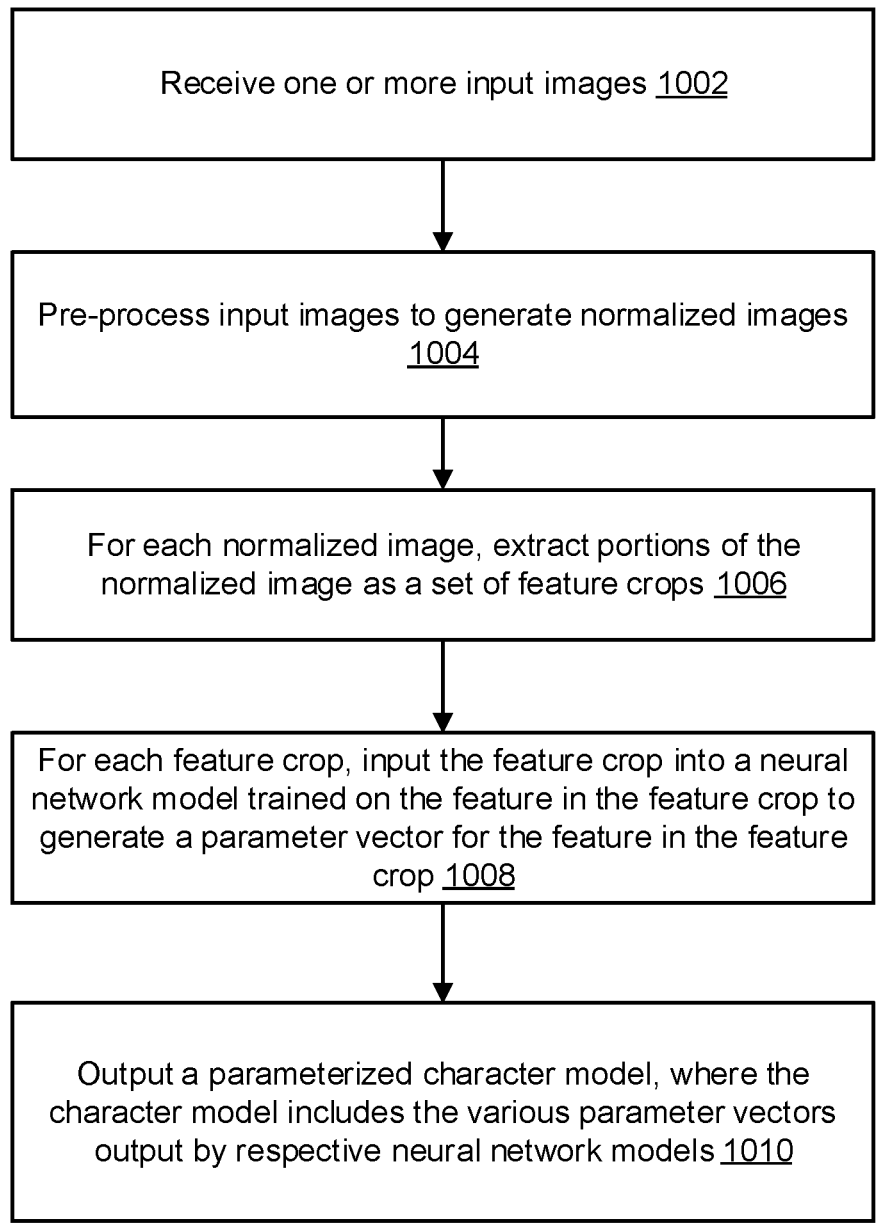
FIG. 10 is a flow diagram of method steps for executing a neural network model to generate one or more parameter vectors from an input image, according to one embodiment.

FIG. 10 is a flow diagram of method steps for executing a neural network model to generate one or more parameter vectors from an input image, according to one embodiment. In various implementations, the method can be performed by the processor 110, the graphics processor 116, or a combination of the processor 110 and the graphics processor 116.

As shown, the method begins at step 1002, where a processor receives one or more input images (i.e., a reference images from which the system will generate a parameterized character model that matches the appearance of the reference image) of a reference subject. In various embodiments, the input image can be obtained in a variety of modalities. For example, a user can take a selfie or other photo of the user. In another example, the image may be uploaded for a set of saved images. The images can be, for example, of a celebrity other real person. In some embodiments, just a single image is provided at step 1002. In other embodiments, multiple images are provided at step 1002.

At step 1004, the processor pre-processes the one or more input images to obtain one or more normalized images. In various embodiments, pre-processing an image may include rotating the image, cropping the image, resizing the image, applying filters to smooth the image and/or reduce detail, among other operations.

Figure 7B:
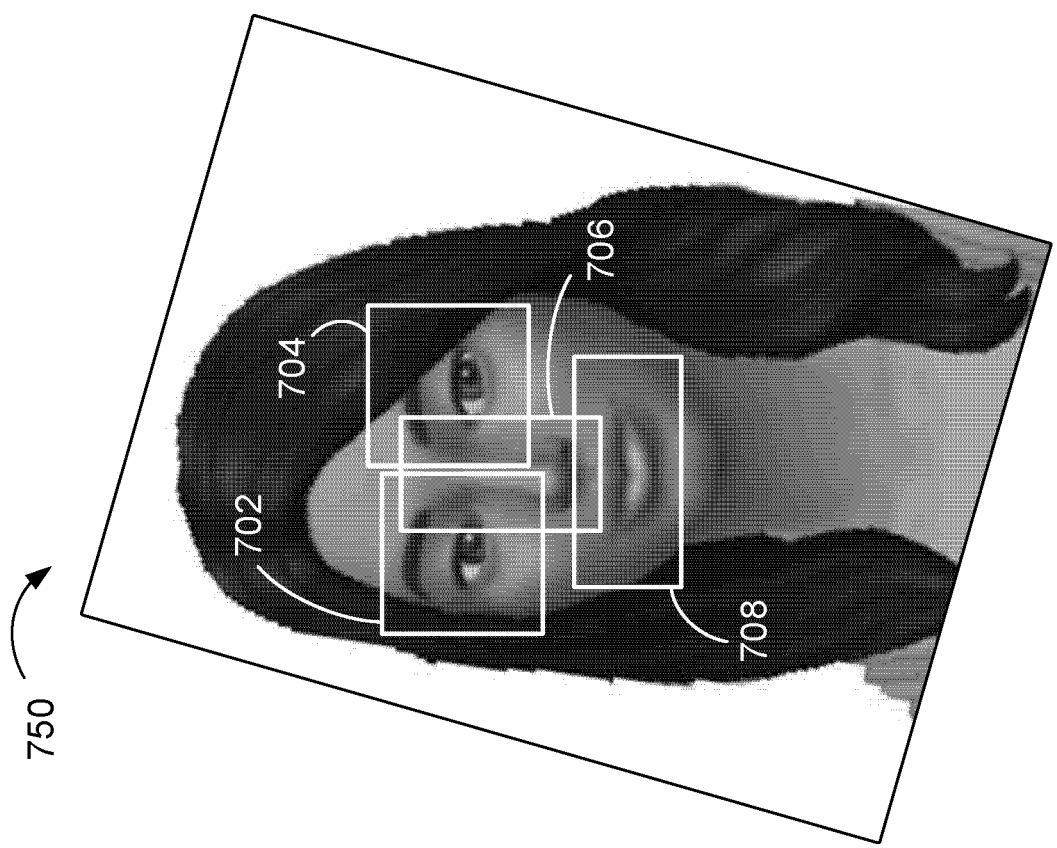
FIG. 7B is an example image of a character model with feature crops overlaid on the image, according to one embodiment.
Figure 7A:
FIG. 7A is an example image of a character model, according to one embodiment.

At step 1006, for each normalized image, the processor extracts portions of the normalized image as a set of feature crops. As described, the character model may be represented as a series of features. Each feature crop may include, for example, the feature in question plus some additional surrounding areas for context. Example feature crops are shown in FIG. 7B.

At step 1008, for each feature crop, the processor inputs the feature crops into a neural network model trained on the feature in the feature crop. The output of each neural network model is a parameter vector for the feature in the feature crop. In other embodiments, any machine learning model besides neural networks can be used, such as regression forests or support vector machines, for example.

At step 1010, the processor outputs a parameterized character model, where the character model includes the various parameter vectors output by respective neural network models corresponding to the different features of the character model. The parameterized character model, therefore, represents a 3D character that, when rendered, as an appears that is similar to the appearance of the input image and is stylized in a manner that is consistent with the training data. In the context of a video game where the characters in the video game are stylized in a certain way and used as the training data for the neural network models, the output parameterized character model would be styled similarly to the existing game characters.

In various embodiments, the model may be an explicit mesh with a texture, or a purely parametric model with a baked texture stack. In other embodiments, any model capable of being used by a game engine to render a character may be used.

In some embodiments, a user may be able to further modify the output parameterized character model by modifying the parameter values for the various features to fine tune the character model to match the reference image.

For skin tone, in one embodiment, the processor samples a clear portion of skin in the input image to identify the skin tone for the character. In another embodiment, the user is prompted to select a skin tone from the character, e.g., from a series of preset skin tones.

Although some embodiments of the disclosure are described in the context of generating a parameterized character model for a head or a humanoid character, other embodiments are equally applicable to other objects or characters, such as for example, animals. In some examples, the disclosed techniques can be used to generate a parameterized character model for pets, such as cats or dogs. Images of pets can be provided by a user. Different machine learning models can be trained on different species of pets. In some implementations, fur pelts or patterns can be determined similarly to skin tone, described above.

Figure 11:
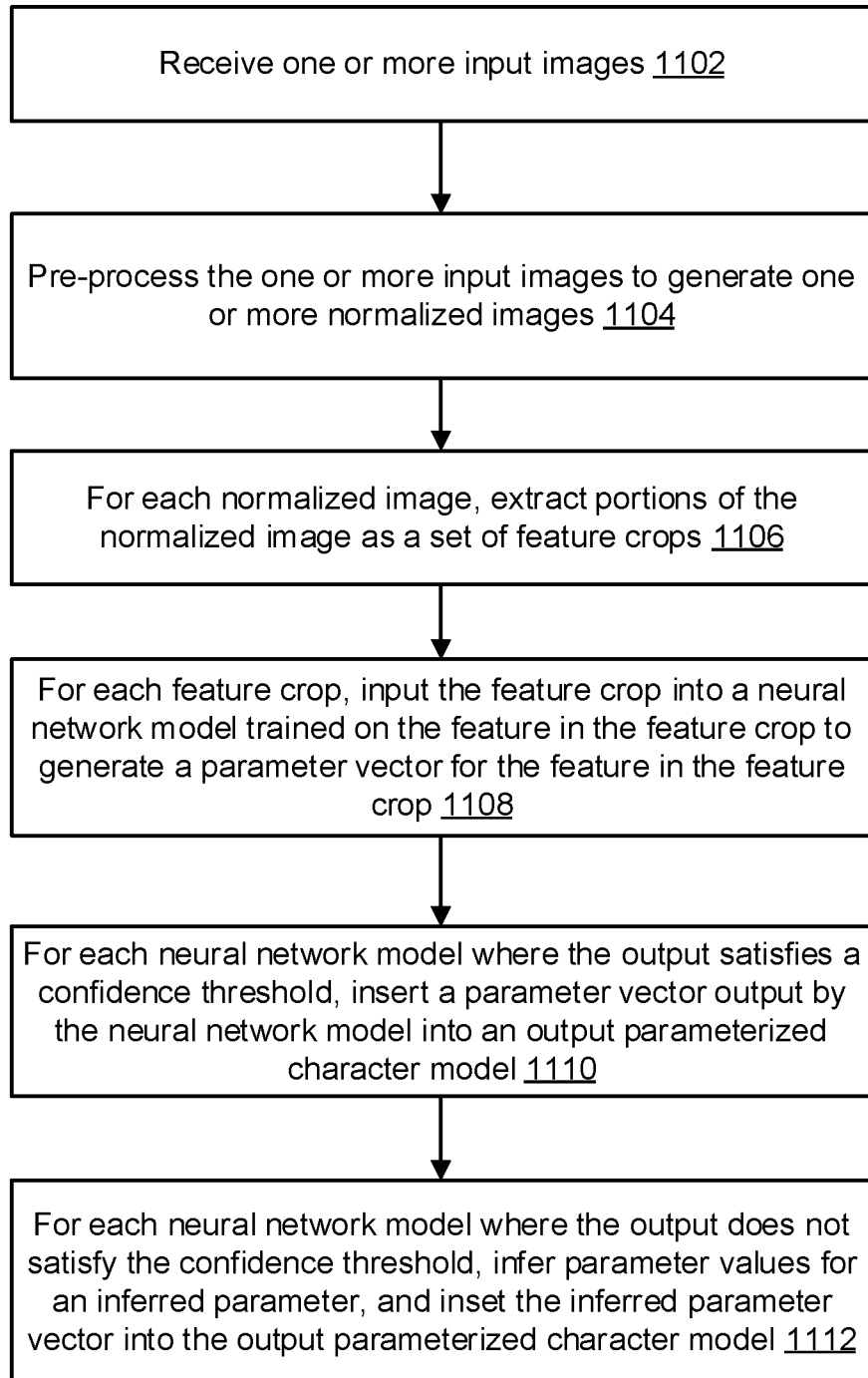
FIG. 11 is another embodiment for executing a neural network model to generate one or more parameter vectors from an input image, according to one embodiment.

FIG. 11 is another embodiment for executing a neural network model to generate one or more parameter vectors from an input image, according to one embodiment. In various implementations, the method can be performed by the processor 110, the graphics processor 116, or a combination of the processor 110 and the graphics processor 116.

The steps 1102, 1104, 1106, and 1108 in FIG. 11 may be similar to steps 1002, 1004, 1006, and 1008, respectively, in FIG. 10 are not described again herein.

At step 1110, for each neural network model where the output satisfies a confidence threshold, the processor inserts a parameter vector output by the neural network model into an output parameterized character model. At step 1112, for each neural network model where the output does not satisfy the confidence threshold, the processor infers parameter values for an inferred parameter vector, and inserts the inferred parameter vector into the output parameterized character model.

In some embodiments, the confidence threshold can provide a measure of how well the input data fits into the neural network model (i.e., "how good is the data"). For example, if the input image included a person wearing dark sunglasses, for the eyes feature, the data in the input image may be poor. In some embodiments, the neural network model is trained on images of persons without glasses and may not be able to generalize to a person with glasses. The reported confidence for the inferred eyes parameters in such case may be low. In one embodiment, average (or "neutral") values can be used for the feature vector to provide a valid input to the rendering. In other embodiments, the processor can infer the parameter values for the feature vector for that feature based on other features that have results that satisfy the confidence threshold.

For the glasses and facial hair cases, some embodiments use a confidence measure to make sure we are introducing glasses or facial hair into the output correctly, so that the processor does not generate false positives when the model is not confident, which may result in poor outcomes (e.g., bearded females). Some poor outcomes (such as bearded females) can be easily filtered out, but adding glasses to the output when glasses are not present in the input image may be similarly undesirable. Thus, some embodiments drop glasses or other features when the confidence is below some "safe" level. In other words, missing glasses in some cases is better than showing them in instances where glasses are not present.

In some embodiments, the processor executes the methods of FIG. 10 and FIG. 11 on user hardware (e.g., personal computer, stand-alone game console, mobile device, tablet, web browser, etc.). In one embodiment, the user hardware includes a game engine configured to receive the parameterized character model and render one or more image of a character corresponding to the parametrized character model.

In another embodiment, the parameterized character model is generated on the user hardware using the methods of FIG. 10 or FIG. 11, and then the parameterized character model is uploaded to a server. The server is configured to receive the parameterized character model and render one or more image of a character corresponding to the parametrized character model. The one or more image of a character rendered on the server are then transmitted back to the user hardware for display. In this manner, a user's privacy may be maintained, for example, since the input images do not leave the user hardware and are not transmitted to the server (i.e., only the parameterized character model is provided to the server).

In some embodiments, the parameterized character model may be rendered into two characters for the user to select from: a male character and a female character, both of which are rendered from the same parameterized character model. In some embodiments, the character rendered from the parameterized character model may have a neutral/unisex gender, and a graphical user interface (GUI) slider may be provided for a user to fine tune the character to be "more female looking" or "more male looking" from the neutral/unisex gender rendering.

Similar to gender, in some embodiments, the character rendered from the parameterized character model may have selected "age." For example, age of the character can be binary: adult or child. In other examples, age of the character may be configurable and may come in several discrete values from child to elder (or senior). In some embodiments, the model can provide a best guess as to age of the character, but the final decision can be left to the user for modification. In other embodiments, the user can provide the age upfront or after the character is created and assigned to a specific age group.

In other embodiments, gender is "baked in" to the parameterized character model, and rendering the parameterized character model results in a character with a gender characteristic according to the data of the parameterized character model.

Figure 12:
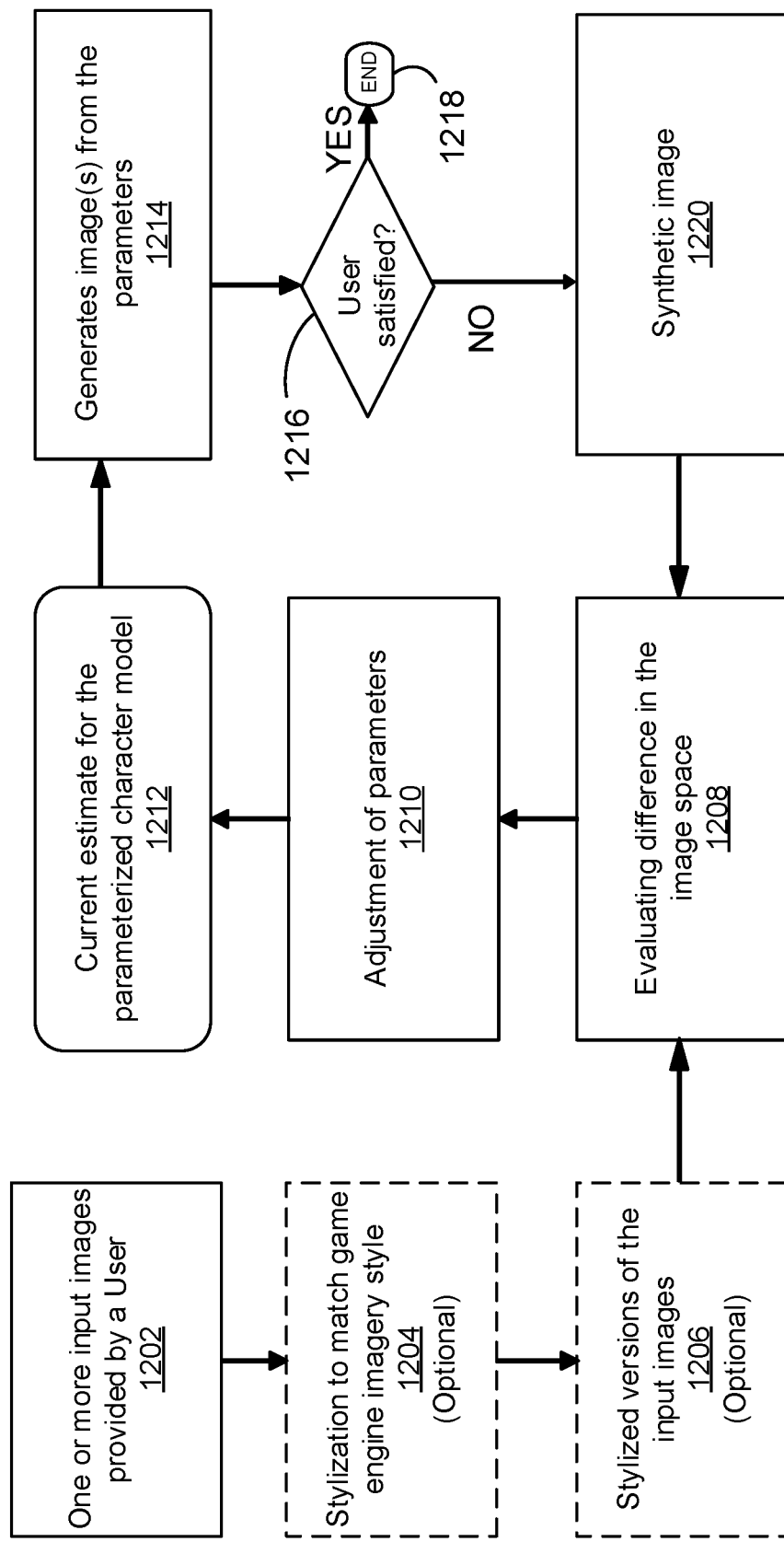
FIG. 12 is a flow diagram illustrating direct optimization of a parameterized character model, according to one embodiment.

FIG. 12 is a flow diagram illustrating direct optimization of a parameterized character model, according to one embodiment. As described above, in one embodiment, a series of neural network models can be trained on individual character features to generate a parameterized character model from an input image. In another embodiment, the parameterized character model can be generated from an input image by direct optimization, as shown in FIG. 12.

As shown in FIG. 12, at step 1202, one or more input images are provided by a user. At step 1204, a processor optionally stylizes the input images to match game engine imagery style. At step 1208, the processor evaluates differences in the stylized version 1206 of the input images in image space. In some embodiments, an advantage of stylizing the input images is easier computation of the "loss function," i.e. evaluating the difference between the input image and the resulting rendered image of the re-created game character. This may be particularly helpful when the game has less realistic or more cartoonish rendering style. Pixel-wise comparison of the real world image to the cartoon character may result in large discrepancy, which may not be informative or relevant to the actual visual facial features similarity of the input and the reconstruction. Thus, some embodiments may pre-process the input images to match the style of the reconstruction in order to get more informative estimation for the quality of matching to the input. This process may be referred to as "reducing domain gap," since the real-world input image is not of the same nature as the rendered game character. The process of stylization is also called "style transfer" and is a frequent technique in the modern data CNN pipelines for image processing.

At step 1210, the processor performs adjustment of the parameters. In some embodiments, one challenge of the direction optimization process for generating the parameterized character model is in the combinatorial explosion of parameter combinations in the optimization process. To make fitting parameters tractable, some embodiments use "presets" or "templates" of character features. In some examples, a template can be based on an archetype of a character. Some embodiments can exploit correlation between various facial and body features common for a particular archetype. In some embodiments, fitting of the parameters can start top down, from matching the template and then fine-tuning continuous and local discreet parameters to improve matching. For example, on each level of a hierarchy, the system can utilize classical and machine learning techniques to construct a digest of the stylized image matching parameters of the corresponding level. Examples include skin tone, shapes of the local features, general shape of the head, hair color, etc. can fed into this part of the system. For simple customizations, the game can use direct non-hierarchical single level optimization with direct matching of the images.

At step 1212, the process outputs a current estimate for the parameterized character model. At step 1212, the processor generates one or more images of the character from the parameterized character model. The one or more images are presented to the user, e.g., on a display device associated with user hardware.

At step 1214, the processor may present a prompt to the user asking the user whether the user is satisfied with the images of the character generated based on direct optimization. If the user indicates that the user is satisfied in response to the prompt, the method ends 1218. If, however, the user indicates that the user is not satisfied in response to the prompt, then the processor generates a synthetic image 1220 of the character. The synthetic image 1220 is input into step 1208, described above, where the processor evaluates differences in the synthetic image 1220 in image space. The method then proceeds to step 1210, where the processor once again performs adjustment of the parameters, and to step 1212, where the processor generates a new current estimate for the parameterized character model. One or more images of the new current estimate for the parameterized character model are generated at step 1214, and presented to the user. This process repeats until the user is satisfied with the result at step 1216.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., user-captured or user-provided images) from a content server. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating a character model, the method comprising:
  receiving, by one or more processors, an input image of a reference subject;
  identifying, by the one or more processors, a set of features present in the input image, wherein each feature in the set of features corresponds to a portion of a head or body of the reference subject;
  for each feature in the set of features, processing, by the one or more processors, at least a portion of the input image including the feature by a neural network model corresponding to the feature to generate a parameter vector corresponding to the feature, wherein for a first feature in the set of features, an initial parameter vector computed by a first neural network model fails to satisfy a confidence threshold;
  inferring parameter values for the first feature to generate an inferred parameter vector for the first feature;
  setting the inferred parameter vector as the parameter vector output by the first neural network model corresponding to the first feature; and
  generating, by the one or more processors, a parameterized character model corresponding to the reference subject in the input image based on combining the parameter vectors output by respective neural network models corresponding to respective features in the set of features, wherein, for each feature in the set of features, a separate neural network model is trained corresponding to the feature, wherein generating the parameterized character model corresponding to the reference subject in the input image is based on the inferred parameter vector for the first feature.

2. The method according to claim 1, wherein training each separate neural network model corresponding to a respective feature in the set of features comprises:
  capturing a set of images of one or more existing character assets;
  identifying a set of parameterized character models corresponding to the images in the set of images of one or more existing character assets, wherein each image of an existing character asset corresponds to a separate parameterized character model representing the existing character asset in the image; and
  for each feature in the set of features, inputting at least a portion of each image of an existing character asset and at least a portion of the corresponding parameterized character model into a neural network model corresponding to the feature to train the neural network model corresponding to the feature.

3. The method according to claim 1, wherein the input image is a photo captured by a camera of a user or an image uploaded by the user.

4. The method according to claim 1, further comprising:
  processing, by the one or more processors, the input image to generate a normalized image, wherein processing the input image to generate the normalized image comprises:
  performing at least one of rotating, cropping, or resizing the input image; and
  applying at least one filter to smooth and/or reduce detail in the input image.

5. The method according to claim 1, wherein the parameterized character model is capable of being processed by a game engine of a video game to render an image of a character corresponding to the parameterized character model.

6. The method according to claim 1, wherein for a first feature in the set of features, a parameter vector output by a first neural network model corresponding to the first feature comprises a set of parameter values for parameters associated with the first feature.

7. The method according to claim 6, wherein the first feature comprises a face shape, a hair style, ears, eyebrows, eyes, nose, cheeks, mouth, chin, jaw, or facial hair.

8. The method according to claim 1, wherein for a first neural network model corresponding to a first feature, the first neural network model includes:
  an encoder configured to process an image received by the encoder to generate a parameter vector for the first feature corresponding to the first neural network model.

9. A non-transitory computer-readable storage medium storing instructions that, when executed by one or more processors, causes a computing device to generate a character model, by performing the steps of:
  receiving an input image of a reference subject;
  identifying a set of features present in the input image, wherein each feature in the set of features corresponds to a portion of a head or body of the reference subject;
  for each feature in the set of features, processing at least a portion of the input image including the feature by a neural network model corresponding to the feature to generate a parameter vector corresponding to the feature, wherein for a first feature in the set of features, an initial parameter vector computed by a first neural network model fails to satisfy a confidence threshold;
  inferring parameter values for the first feature to generate an inferred parameter vector for the first feature;
  setting the inferred parameter vector as the parameter vector output by the first neural network model corresponding to the first feature; and
  generating a parameterized character model corresponding to the reference subject in the input image based on combining the parameter vectors output by respective neural network models corresponding to respective features in the set of features, wherein, for each feature in the set of features, a separate neural network model is trained corresponding to the feature, wherein generating the parameterized character model corresponding to the reference subject in the input image is based on the inferred parameter vector for the first feature.

10. The computer-readable storage medium according to claim 9, wherein training each separate neural network model corresponding to a respective feature in the set of features comprises:
   capturing a set of images of one or more existing character assets;
   identifying a set of parameterized character models corresponding to the images in the set of images of one or more existing character assets, wherein each image of an existing character asset corresponds to a separate parameterized character model representing the existing character asset in the image; and
   for each feature in the set of features, inputting at least a portion of each image of an existing character asset and at least a portion of the corresponding parameterized character model into a neural network model corresponding to the feature to train the neural network model corresponding to the feature.

11. The computer-readable storage medium according to claim 9, wherein the input image is a photo captured by a camera of a user or an image uploaded by the user.

12. The computer-readable storage medium according to claim 9, the steps further comprising:
   processing the input image to generate a normalized image, wherein processing the input image to generate the normalized image comprises:
      performing at least one of rotating, cropping, or resizing the input image; and
      applying at least one filter to smooth and/or reduce detail in the input image.

13. The computer-readable storage medium according to claim 9, wherein the parameterized character model is capable of being processed by a game engine of a video game to render an image of a character corresponding to the parameterized character model.

14. The computer-readable storage medium according to claim 9, wherein for a first feature in the set of features, a parameter vector output by a first neural network model corresponding to the first feature comprises a set of parameter values for parameters associated with the first feature.

15. The computer-readable storage medium according to claim 14, wherein the first feature comprises a face shape, a hair style, ears, eyebrows, eyes, nose, cheeks, mouth, chin, jaw, or facial hair.

16. The computer-readable storage medium according to claim 9, wherein for a first neural network model corresponding to a first feature, the first neural network model includes:
   an encoder configured to process an image received by the encoder to generate a parameter vector for the first feature corresponding to the first neural network model.

17. A device for generating a character model, the device comprising:
   a memory storing instructions; and
   one or more processors configured to the execute the instructions to cause the device to:
      receive an input image of a reference subject;
      identify a set of features present in the input image, wherein each feature in the set of features corresponds to a portion of a head or body of the reference subject;
      for each feature in the set of features, process at least a portion of the input image including the feature by a neural network model corresponding to the feature to generate a parameter vector corresponding to the feature, wherein for a first feature in the set of features, an initial parameter vector computed by a first neural network model fails to satisfy a confidence threshold;
      infer parameter values for the first feature to generate an inferred parameter vector for the first feature;
      set the inferred parameter vector as the parameter vector output by the first neural network model corresponding to the first feature; and
      generate a parameterized character model corresponding to the reference subject in the input image based on combining the parameter vectors output by respective neural network models corresponding to respective features in the set of features, wherein, for each feature in the set of features, a separate neural network model is trained corresponding to the feature, wherein generating the parameterized character model corresponding to the reference subject in the input image is based on the inferred parameter vector for the first feature.

18. The device according to claim 17, wherein training each separate neural network model corresponding to a respective feature in the set of features comprises:
   capturing a set of images of one or more existing character assets;
   identifying a set of parameterized character models corresponding to the images in the set of images of one or more existing character assets, wherein each image of an existing character asset corresponds to a separate parameterized character model representing the existing character asset in the image; and
   for each feature in the set of features, inputting at least a portion of each image of an existing character asset and at least a portion of the corresponding parameterized character model into a neural network model corresponding to the feature to train the neural network model corresponding to the feature.

* * * * *